Oct. 6, 1959  H. H. ROBY  2,907,296
DRIVE AND TRANSMISSION FOR POWER-DRIVEN PADDLE WHEEL BOAT
Filed April 15, 1957  2 Sheets-Sheet 1

INVENTOR.
Horace H. Roby
BY
Thos. E. Scofield
ATTORNEY

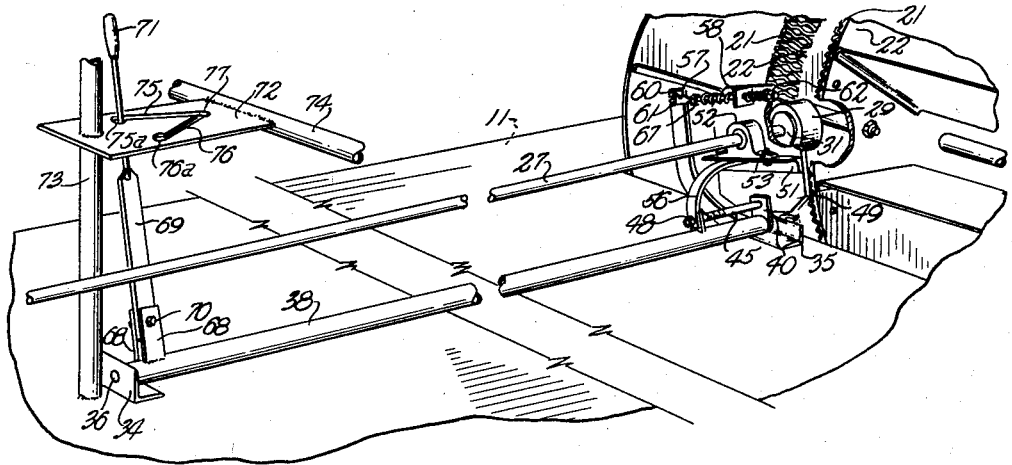
Fig. 2.
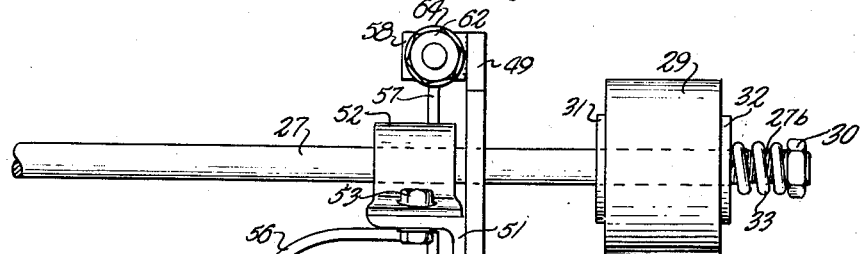
Fig. 3.
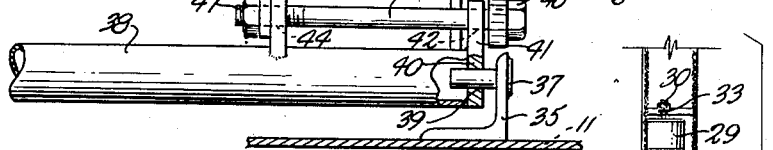
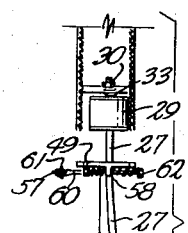
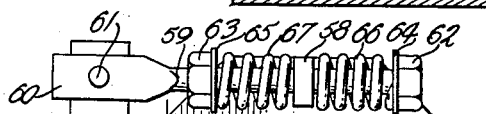
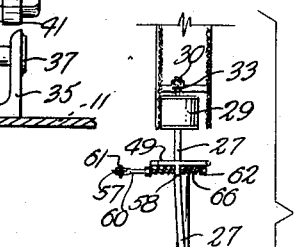
Fig. 4. Fig. 5. Fig. 6.
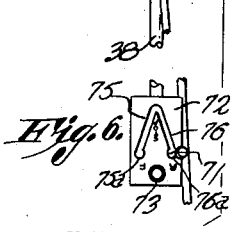
INVENTOR.
Horace H. Roby
BY
Thos. E. Scofield
ATTORNEY

United States Patent Office 2,907,296
Patented Oct. 6, 1959

2,907,296

DRIVE AND TRANSMISSION FOR POWER-DRIVEN PADDLE WHEEL BOAT

Horace H. Roby, Springfield, Mo., assignor to Roby-Hutton, Springfield, Mo., a partnership Application April 15, 1957, Serial No. 652,848

9 Claims. (Cl. 115—49)

This invention relates to drive and transmission systems for boats and refers more particularly to a drive and transmission system for paddle wheel power boats which can driven the paddle wheels either in forward or reverse motion without reversing the direction of rotation of the power source drive shaft or disconnecting the drive means for the paddle wheels from the power source therefor.

An object of the invention is to provide a drive and transmission system for paddle wheel power boats wherein there is a direct drive connection between the power source and the paddle wheels in either forward or reverse motion of the paddle wheels.

Another object of the invention is to provide a drive and transmission system for paddle wheel power boats wherein the power source is never disconnected or disengaged from the means for transmitting the power directly to the paddle wheels.

Another object of the invention is to provide a drive and transmission system for paddle wheel power boats which is extremely simple, rugged in construction and having great simplicity of operation.

Another object of the invention is to provide a drive and transmission system for paddle wheel power boats wherein means are provided to protect the power source from back lash or feed back due to obstruction or hindering of the paddle wheels in their rotation either in forward or reverse motion.

Another object of the invention is to provide a drive and transmission system for paddle wheel boats wherein the power is communicated directly to the paddle wheels from the power source without intermediate clutch mechanism or linkage yet a gradual application of power at any rate desired is available whereby to smoothly and evenly bring the paddle wheels up to speed in either forward or reverse motion.

Yet another object of the invention is to provide a drive and transmission system for paddle wheel power boats wherein the drive connection between the power source and the paddle wheels is such that the power is applied directly to the peripheries of the wheels themselves, this connection being such as to operate effectively wet and, indeed, operate best wet, the water picked up by the paddle wheels serving as a lubricant at this location in the system.

Yet another object of the invention is to provide a drive and transmission system for paddle wheel power boats wherein, while the application of power to bring the paddle wheels up to speed may be regulated as finely as desired, the engagement in the drive position between the power source and the paddle wheels in either forward or reverse motion is extremely positive and effective while yet permitting resilience within and slippage of the transmission system when and if the paddle wheels encounter obstructions whereby to avoid shock or damage to the engine or transmission system itself.

Yet another object of the invention is to provide such a drive system and transmission system for paddle wheel power boats which has a long operating life and when or if repairs or part replacements may be required, is extremely accessible for and simple to repair.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Fig. 2 is a perspective view of the inventive drive and transmission system for power driven paddle wheel boats with parts broken away and shortened to show the entire control and paddle wheel engagement portions.

Fig. 3 is a side view with parts in section of a portion of the inventive drive and transmission system.

Fig. 4 is a front view of the construction shown in Fig. 3.

Fig. 5 is a top schematic view of portions of the system to illustrate the drive wheel engaging one paddle wheel.

Fig. 6 is a view similar to that of Fig. 5 showing the drive wheel engaging the other paddle wheel.

Figure 1:
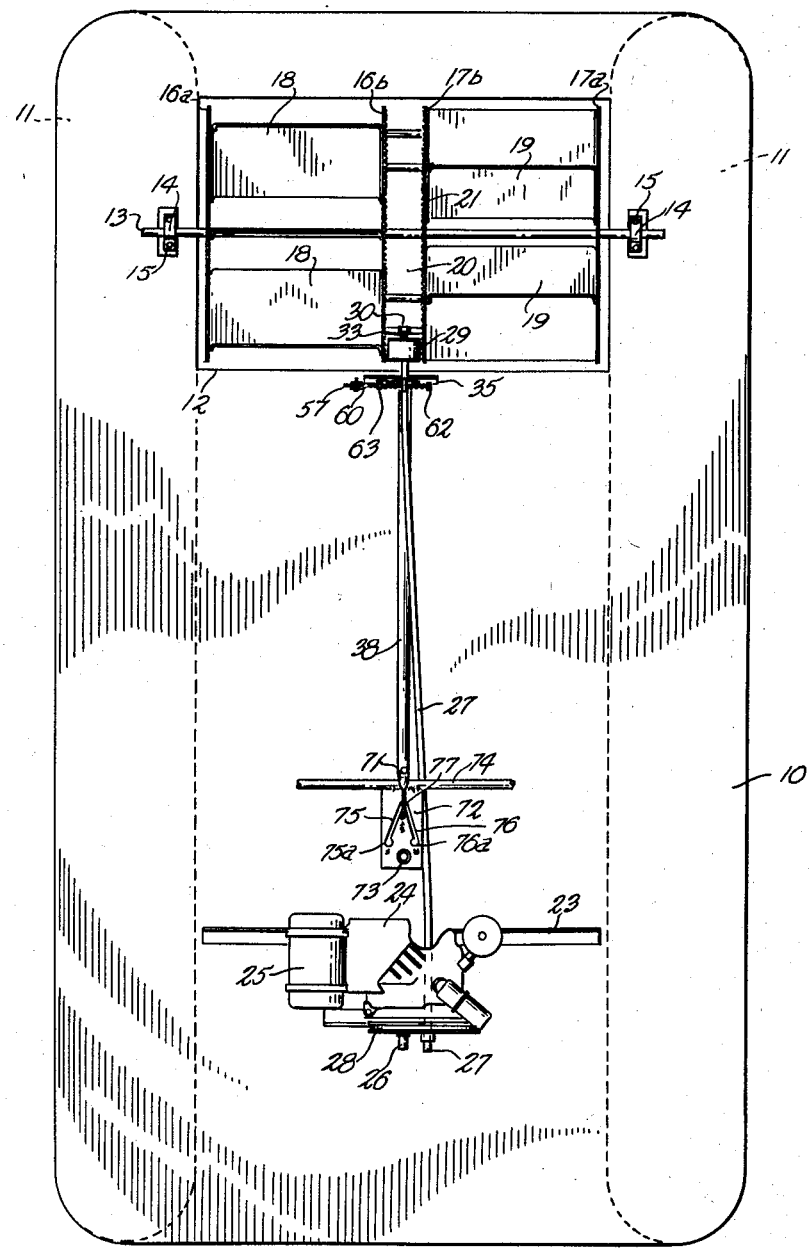
Fig. 1 is a plan view of the deck of a power driven paddle wheel boat on which an embodiment of the inventive drive and transmission power system has been mounted.

Referring to Fig. 1 particularly, therein is shown in plan view the deck 10 of a boat frame which has affixed to the underside thereof flotation means. The particular construction of the deck and flotation means is preferably that of but not limited to that shown in my application Serial No. 496,563, filed March 25, 1955, entitled "Power-Driven Paddle Wheel Boat," now abandoned, wherein, on its underside, the deck has a pair of laterally spaced pontoon-like buoyancy chambers 11 which extend the full length of the deck on either side thereof. Each buoyancy chamber is hollow, being rectangular in transverse cross section with rounded end walls as shown in dotted lines on Fig. 1. The buoyancy chambers are fabricated of sheet metal but need not be watertight, and conveniently, the upper wall of each float chamber may be formed by the deck itself to avoid using a double thickness of metal in that area.

The deck 10 itself is continuous throughout the forward portion of the craft but in the rear portion thereof it contains an opening 12 through which a pair of paddle wheels (to be described) can engage the water below the deck level. This opening preferably extends substantially the full width of the space between the two float chambers 11 and is positioned rearwardly on the deck of the engine mounting presently to be described.

I prefer to construct each float in the form of an unpartitioned, hollow chamber whose interior is open throughout its full length. Into this I insert "logs" or slabs of foamed plastic material cut to fit snugly against the inside walls of the float chamber. Although relatively rigid, the logs or slabs of this material are exceedingly light in weight, being composed of myriads of small air cells, each hermetically sealed by the resinous or other plastic material making up the body of the log. A light weight cellular material of the character described which is very satisfactory for the purpose is Styrofoam, manufactured by the Dow Chemical Company of Midland, Michigan. For the purpose of inserting logs or slabs of such block flotation material into the elongate float chambers 11, I provide each compartment with a removable end cover (not shown). As previously indicated the chambers 11 need not be watertight, inasmuch as the cellular plastic material is not subject to waterlogging and will maintain its buoyancy for the life of the craft even though partially immersed. In the event of collision, only such cells as are mechanically ruptured by the impact will lose their buoyancy—and since this can never represent more than a small fraction of the total number of cells, a craft provided with this material in the manner described is, for all practical purposes, unsinkable and invulnerable to accidental injury.

All of the structure thus far described preferably is made of light weight metal, for example, aluminum. The sheet metal parts may be connected together by rivets even in fabricating the hollow floats or buoyancy chambers 11, it being an important feature of the invention that these chambers need not be watertight. An alternative float means which may be employed with the deck construction of Fig. 1 is that shown in my Patent No. 2,744,267, issued May 2, 1856, "Water Scooter." In this modification, the interior of each hollow float chamber may be partitioned at intervals along its length to divide it into a series of compartments, each compartment being used to house an inflated inner tube in the manner disclosed in the above patent. With this arrangement, the inner tubes (or equivalent inflatable members) give the necessary buoyancy whether or not the metal compartments themselves are watertight, the metal serving only as a protective housing for the inner tubes. Should the metal be accidentally ruptured through collision or otherwise, even the inner tube nearest the rupture frequently will escape damage; but should one of the inner tubes be punctured, the remaining undamaged ones nevertheless always serve to maintain the craft afloat in substantially its normal condition.

It should be understood that the above described float constructions are merely those conveniently applicable to support a deck of the construction described and the particular float means or construction does not comprise a part of the instant invention.

A paddle wheel axle or shaft 13 is mounted on deck 10 by and journaled in bearings 14 which are fixed to the deck by bolts 15. The axle or shaft 13 extends across the opening 12 in the deck substantially intermediate the transverse edges thereof and substantially at right angles to the longitudinal axis of the deck. A pair of paddle wheels are fixedly mounted on the axle 13 whereby to both simultaneously rotate either in forward or reverse motion therewith. Paddle wheel end plates 16a and b and 17a and b, respectively, have mounted therebetween sets of circumferentially spaced blades or paddles 18 and 19. The blades of one paddle wheel are preferably staggered circumferentially relative to those of the other, so that in the course of rotation of the paddle wheels, the blades of the respective sets engage the water alternately, providing greater frequency of contact and smoother, more uniform operation. As may be seen in Fig. 2 each blade or paddle extends inwardly from the margin of the circular end plates 16a, 16b, 17a and 17b to a point short of the axle 13, leaving an open space about the paddle wheel axis or shaft 13. The blades are preferably not radial but have their innermost ends pitched forwardly in the direction of rotation of the wheel, so that each lies in a plane which is tangent to an imaginary cylinder concentric with the shaft but substantially larger in diameter. Due to its forward pitch, each blade enters the water at a flatter or more nearly horizontal angle and then advances rearwardly with an oblique, somewhat slicing motion which is characterized by a greater component of downward thrust on the water than would be the case if the blades were radial. This minimizes loss of efficiency through churning of the water and wash over the inner ends of the blades, whereby the energy input to the paddle wheel is more effectively utilized in producing forward propulsion of the boat; moreover, the blades leave the water with a better "drain angle" so that there is less elevated discharge and spray of water to the rear of the boat when it is in motion. Notwithstanding this, it will be understood that there is inevitably some small churning aft of the paddle wheel.

The normal engine hood, paddle wheel hood, steering means, seats, etc., are not illustrated or shown in order to more completely show the inventive drive and transmission mechanism.

Referring now to this drive and transmission system, it should be noted that the two paddle wheels on axle 13 are spaced apart centrally to provide a drive gap 20 therebetween. Fixedly attached to the peripheral central edges of the paddle wheel end disks 16b and 17b are frictional engagement means 21. These means are more clearly seen in Figs. 2, 5 and 6 and may preferably comprise a continuous wire meshwork of relatively strong and open construction which is fixed by bolts or rivets 22 to the peripheries of the paddle wheel disks. It is necessary that the construction of this meshwork be sufficiently strong and rigid enough to take the drive forces applied thereto, as previously described, and that it be rigidly fixed to the drive wheel disks to transmit this force thereto to turn the paddle wheels. Thus it is seen that the drive gap 20 is bounded on each side by this frictional engaging mesh or means 21.

Fixedly mounted to the front end of the deck, say to such means as angle iron 23, is power source or conventional engine 24, having gas tank 25 with cylinder drive shaft 26 preferably mounted along a line bisecting the drive gap and at right angles to axle 13 and secondary drive shaft 27 connected to the primary drive shaft by belt 28 which engages pulleys mounted on both drive shafts. Primary drive shaft 26 drives secondary drive shaft 27 which is displaced only a few inches from the center line of the deck and the line bisecting the drive gap 20. Drive shaft 27 is elongate enough to extend back into the drive gap 20. The displacement of the front end of the shaft 27 relative the center line of the boat is exaggerated by Fig. 1. If the distance between the motor and the drive gap is not sufficiently great the drive shaft 27 may necessarily be somewhat flexible whereby to rotate with a slight curvature therein.

In Fig. 3 may be seen the friction wheel 29 which is mounted on the end of the device shaft 27a extending into the drive gap, wheel 29 being made of rubber or other resilient engaging material such as a synthetic rubber compound which is dimensionally stable and tough yet somewhat resilient. Drive shaft 27a has threaded end 27b upon which nut 30 is mounted. Fixed flange 31 is welded to shaft 27 and wheel 29 abuts thereagainst. Free washer 32 encircles shaft 27a and abuts the rear face of wheel 29, forced thereagainst by spring 33 which abuts nut 30 with its other end. Flange 31 serves as a drive plate for wheel 29. The assembly of plate 31, washer 32, spring 33 and nut 30 serves as an auxiliary slippage means. Tension of spring 33 allows slippage of wheel 29 on shaft 27 in extreme shock conditions, such as occur if the wheel is shifted from one paddle wheel to the other while the paddle wheels are still rotating in the first direction. In such instance, there is a short period of slippage between wheel 29 and shaft 27 until the paddle wheels are stopped and started in the opposite direction.

As may be seen from Figs. 1, 5 and 6, the diameter of the friction wheel 29 is less than the width of the drive gap 20 whereby the friction wheel may be centrally positioned between the two paddle wheels without contacting the friction engaging means 21 of either of them or, as in Figs. 5 or 6, alternately engaged with the friction engaging means 21 of either paddle wheel whereby to drive them in forward or reverse motion. If, for example, the rotation of the drive shaft 27 in Fig. 1 is from the right to the left (or counterclockwise) in Fig. 2, it will be seen that by contacting the friction wheel rotating in this direction with the left-hand paddle wheel disk 16b, both paddle wheels will be rotated in a forward drive direction in Fig. 2. On the other hand, if the friction wheel is rotating in the same direction and is contacted with the lefthand paddle wheel disk 17b as in Fig. 6, both of the paddle wheels will be rotated in a reverse drive direction. Thus for a single direction of rotation of the drive shaft 27, by alternately engaging the friction wheel 28 with one paddle wheel disk and then the other, the paddle wheels may be rotated alternately in forward and reverse motion. Means thus must be provided to move the drive shaft 27 and friction wheel 29 back and forth in a substantially horizontal direction relative the deck 10 to accomplish this. This means will now be described.

Angle iron 34 adjacent the motor angle iron 23 and like angle iron 35 immediately forward of the opening 12 in the deck 10 are rigidly fixed to the deck 10 and have their upwardly extending faces at right angles to the longitudinal axis of the deck 10. Pins 36 and 37 are fixed to the upwardly extending angle iron faces and extend inwardly therebetween. Torque tube 38 is mounted on said pins and rotatable thereon, the tube itself preferably hollow and having closed ends as is seen in Fig. 3 with openings formed in the closed ends (as shown at 39) to receive rotatably the pins extending from the angle irons. The end closure 40 of the end of the torque tube adjacent the paddle wheels has an upward extension 41 having an opening 42 extending therethrough. Flange 43 is fixed to the top of the torque tube by welding or other other means forwardly of the paddle wheel end of the torque tube and also has an opening 44 therein of the same diameter as opening 42 in flange 41. Shaft 45 having head 46 on the rear end thereof and threaded portion 47 on the forward end thereof engaged by nut 48 extends through flanges 41 and 43 and the openings 42 and 44 therein.

Bearing mounting plate 49 has an opening 50 adjacent the lower end thereof and centrally thereof through which shaft 45 also extends. Angle iron 51 is fixed by welding or other conventional means to the front face of bearing mounting plate 49. Fixed to the top surface of angle iron 51 by bolts 53 is bearing mount 52 which has bearing 54 centrally thereof to receive the drive shaft 27a. Plate 49 also has an opening 55 therein to permit the extension of the drive shaft 27a therethrough. Leaf support 56 rotatably engages shaft 45 with one end thereof and is bolted to or otherwise fixed to the bottom surface of angle iron 51 to offer further support to the bearing plate 49 relative the shaft 45. From the construction already described, it may be seen that the bearing plate 49 can rotate around the axis of the shaft 45, thus carrying the bearing mount 52 in a fairly flat arc relative the shaft 45 and permitting the lateral motion of the friction wheel 29 to engage the friction engaging means on the paddle wheels alternately.

Arm 57 (Fig. 4) is fixed by welding or other means to the torque tube 38 whereby to turn therewith and has its upward end extending at least to a level adjacent the top of the bearing plate 49. Shaft receiving flange or plate 58 is fixed centrally to the top of the bearing plate 49 and has an opening centrally thereof extending therethrough. Top bearing plate shaft 59 extends through the said opening in flange 58 and has split tongue portion 60 engaging two sides of the top end of the arm 57, to which pin 61 rotatably attaches it. Shaft 59 has two threaded portions, one adjacent its free end and one adjacent the bifurcated portion 60 to be engaged by nuts 62 and 63, respectively. Washers 64 and 65 serve as outer abutment means for springs 66 and 67, respectively, which also centrally abut the outer faces of the flange member 58. The shaft 59 moves freely through the opening in the flange 58 retarded only by the resistance of the coil springs 66 and 67. The coil springs 66 and 67 retard the free motion of the bearing plate 49 around the shaft 45.

The means for rotating the torque tube to move the bearing 54 laterally to engage the friction wheel 29 with the two paddle wheels alternately is best shown in Figs. 1 and 2. Flange arms 68 are welded or otherwise fixed at one end to the top of the torque tube so as to extend vertically when the bearing 54 is intermediate the two paddle wheels or in line with the bisector of the drive gap 20. Control arm 69 has its lower end extending between the flanges 68 and movably fixed thereto by pin 70. Handle 69 has grip 71 attached to the upper end thereof. Slotted plate 72 is preferably fixed substantially horizontally parallel to the deck and is supported relative thereto by front post 73 which is welded to the deck at its lower end and to the plate 72 at its upper end, and horizontal member 74 which is fixed to part of the boat housing (not shown) or to the deck by any sort of vertically extending posts or like means. The function of supports 73 and 74 is to rigidly and positively fix the horizontal plate 72 in position relative the deck and the paddle wheels so the plate 72 will not move upon application of lateral force or longitudinal force thereto.

Plate 72 has a pair of angled slots 75 and 76 therein extending outwardly at acute angles to the line bisecting the drive gap. The base 77 of the slots 75 and 76 is common whereby the handle 69, which extends through the slots, may be passed from one slot to the other. Slot 75 and 76 have engagement points 75a and 76a adjacent the forward ends thereof. The displacement of these engagement points from the line bisecting the drive gap is sufficiently great that rotation of the torque tube due to motion of the handle 69 in the slots will strongly bring the friction wheel 29 against one or the other friction engaging means 21 of one or the other of the central paddle wheel disks 16b and 17b.

It should be noted that, as in Fig. 1, the lateral displacement of the drive shaft 27 adjacent the engagement point 76a is greater than the distance of the engagement point 76a from the line bisecting the drive gap, whereby there is no contact between the drive shaft 27a with the handle 69. This adjustment is achieved by positioning the plate 72 closer to or further from the motor 24. Since the tendency, as will be described, of the friction wheel 29 is to return toward its central position, the handle 69 is readily engaged in one of the engagement points 75a or 76a until it is desired to return the drive and transmission mechanism again into neutral.

In describing the operation of the drive and transmission mechanism, it should first be noted that under certain circumstances the drive shaft 27 must be of a material which will stand rotation and flexion at the same time due to its curvature (most readily seen in Fig. 1). Secondly, when the handle 69 is at the slot juncture 77, the handle 69 is vertical, the bearing 54 is vertically above the torque tube 38 and the friction wheel 29 is positioned centrally in the drive gap intermediate between and not touching either of the paddle wheel disks 16b or 17b. To rotate the torque tube and move the bearing 54 laterally to bring the friction wheel 29 in engagement with either of the paddle wheel central disks, the handle 69 is advanced forwardly into either slot 75 or 76. The lateral motion of the handle 69 as it moves forwardly in either of the slots is transmitted through the flanges 68 to the torque tube, rotating it around the pins 36 and 37. Were the torque tube not attached to the upper end of the bearing plate 49 by arm 57, the plate 49 would tend to rotate about shaft 45 and permit the friction wheel 29 to remain centrally of the drive gap. However, the arm 57 rotates with torque tube 38 and through spring 66, the upper portion of the plate 49 is moved in an arc thus bringing the friction wheel 29 into engagement with one of the friction engaging means 21.

The mounting of the plate 49 with yieldable means on either side of flange 58 is to provide for the possibility of the paddle wheels hitting obstructions in either forward or reverse motion and back lashing on the friction wheel. If such is the case, any back force applied against the friction wheel 29 will tend to act against the springs 66 or 67 which yield if the force is sufficient and permit slipping of the wheel 29 over the friction engaging means as the plate 49 is moved in counterrotation to the rotation being urged by the torque tube. To permit motion of plate 49 relative shaft 59, the opening in flange 58 must be slightly greater than the diameter of the shaft 59 to permit a certain amount of play of the shaft within the opening. The amount of force required to counterrotate the plate 49 against the rotation of the torque tube depends upon the resilience or inherent strength of the springs 66 and 67. It should be noted that plate 49, in responding to any counteraction against the wheel 29, rotates around the shaft 45 while the torque tube remains fixed in its position defined by the control stick 69 in the slots. Due to the above described yieldable construction, protection is afforded for the friction wheel 29 itself, the friction engaging means 21, the bearing 54 which would have to take any such shocks, the drive shaft 27 and the engagement between the drive shaft 26 and drive shaft 27 of the motor.

Another feature which should be pointed out is that it is necessary for the operation of this device that the paddle wheels run in water as, otherwise, without the liquid lubricating the rubber friction wheel, the friction engaging means would grind away or tear up the friction wheel itself. However, with the water carried by the engaging means in the rotation of the paddle wheels, sufficient lubrication is afforded that a single friction wheel will easily last a whole season without requiring any other lubrication. This is particularly important in view of the large mesh structure of the friction engaging means 21.

From the foregoing it will be seen that this invention is one well adapted to attain all the ends and objects hereinabove set forth together with other advantages which are obvious and which are inherent to the strucure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein above set forth or shown in the accompanying drawings is to be interpreted as illustrative and not in a limiting sense.

Having thus described my invention, I claim:

1. A transmission system for a wheel which runs at least partly submerged in liquid comprising a first wheel, means rotatably mounting said first wheel for rotation at least partly submerged in liquid, a rotatable drive shaft having a portion thereof opposite the peripheral area of said wheel next one side thereof and extending substantially at right angles to the axis of rotation of said wheel, a drive wheel mounted on said drive shaft to rotate therewith and having at least a portion thereof opposite the said peripheral area of said first wheel, means for rotating said drive shaft, means for moving said drive shaft substantially at right angles to its axis of rotation toward and away from said first wheel whereby to sequentially contact and disengage said drive wheel and said peripheral area of the first wheel, the drive wheel formed of resilient, deformable, yet normally dimensionally stable material, and corrugated means on the peripheral area of the first wheel contacted by said drive wheel into which portions of said drive wheel fit to provide a positive drive engagement between the first wheel and the drive wheel.

2. A transmission system as in claim 1 wherein the width of the corrugated means is no greater than the depth the first wheel is received in the liquid in normal operation and rotation thereof.

3. A transmission system as in claim 1 including resilient mounting means connecting the drive wheel to the drive shaft whereby to permit slipping of the drive wheel on the drive shaft on application of sufficient force thereto.

4. A transmission system as in claim 1 wherein the corrugated means comprises an open wire mesh fixed substantially continuously around the peripheral area of the first wheel.

5. A transmission system as in claim 1 wherein the means for moving the drive shaft back and forth to contact the drive wheel with the corrugated means on the first wheel comprises a bearing positioned between the drive shaft rotating means and first wheel through which the drive shaft extends, a torque tube mounted between the drive shaft rotating means and the first wheel rotatable around its longitudinal axis, the longitudinal axis of the torque tube at least substantially aligned with the drive shaft axis and substantially at right angles to the axis of rotation of the first wheel, the lower end of the bearing pivotally mounted on the upper portion of the torque tube, an arm fixed at its lower end to the torque tube and at its other end resiliently to the upper end of the bearing, and means for rotating the torque tube in both directions around its axis.

6. A transmission system for a paddle wheel boat comprising a boat, a paddle wheel rotatably mounted on said boat and operable to contact liquid floating the boat with the peripheral area thereof in rotation thereof, a rotatable drive shaft having a portion thereof opposite the peripheral area of said paddle wheel next one side thereof and extending substantially at right angles to the axis of rotation of said paddle wheel, a drive wheel mounted on said drive shaft to rotate therewith and having at least a portion thereof opposite the said peripheral area of said paddle wheel, means for rotating said drive shaft, means for moving said drive shaft substantially at right angles to its axis of rotation toward and away from said paddle wheel whereby to sequentially contact and disengage said drive wheel and said peripheral area of the paddle wheel, the wheel formed of resilient, deformable, yet normally dimensionally stable material, and corrugated means on the peripheral area of the paddle wheel contacted by said drive wheel into which portions of said drive wheel fit to provide a positive drive engagement between the paddle wheel and the drive wheel.

7. A transmission system for a pair of reversible wheels which run at least partly submerged in liquid comprising a first pair of wheels, said first pair of wheels fixedly mounted on an axle for rotation therewith at least partly submerged in liquid, said wheels spaced apart one from the other to provide a drive gap therebetween, a rotatable drive shaft having at least a portion thereof extending into the drive gap and extending substantially at right angles to the axis of rotation of said first pair of wheels, means for rotating said drive shaft, means for moving said drive shaft substantially at right angles to its axis of rotation toward and away from each of said first wheels whereby to sequentially contact and disengage said drive wheel and the peripheral area of one of said first wheels, the drive wheel formed of resilient, deformable, yet normally dimensionally stable material, and corrugated means on the peripheral areas of the first wheels facing into the drive gap and contacted by said drive wheel into which portions of said drive wheel fit to provide a positive drive engagement between the engaged first wheel and the drive wheel in either forward or reverse motion of the first wheels.

8. Apparatus as in claim 7 wherein the means for moving the drive shaft back and forth to contact the drive wheel with the corrugated means on the wheels comprises a bearing positioned between the drive shaft rotating means and wheels through which the drive shaft extends, a torque tube mounted between the drive shaft rotating means and the wheels rotatable in both directions around its longitudinal axis, the longitudinal axis of the torque tube substantially aligned with the drive shaft axis and substantially at right angles to the axis of rotation of the first pair of wheels, the lower end of the bearing pivotally mounted on the upper portion of the torque tube, an arm fixed at its lower end to the torque tube and at its other end resiliently to the upper end of the bearing, and means for rotating the torque tube in both directions around its longitudinal axis.

9. A transmission system for a pair of reversible paddle wheels which run at least partly submerged in liquid comprising a first pair of paddle wheels, said pair of paddle wheels fixedly mounted on an axle for rotation therewith each at least partly submerged in liquid, said paddle wheels spaced apart one from another to provide a drive gap therebetween, a rotatable drive shaft having at least a portion thereof extending into the drive gap and extending substantially at right angles to the axis of rotation of said pair of paddle wheels, means for rotating said drive shaft, means for moving said drive shaft substantially at right angles to its axis of rotation toward and away from each of said paddle wheels whereby to sequentially contact and disengage said drive wheel and the peripheral area of one of said paddle wheels, the drive wheel formed of resilient, deformable yet normally dimensionally stable material, and corrugated means on the peripheral area of the paddle wheels facing into the drive gap and contacted by said drive wheel into which portions of said drive wheel fit to provide a positive drive engagement between the paddle wheel being engaged by the drive wheel and the drive wheel.

References Cited in the file of this patent

UNITED STATES PATENTS

| | | |
|---|---|---|
| 751,878 | Spangler | Feb. 9, 1904 |
| 827,619 | Cox | July 31, 1906 |
| 1,374,049 | White | Apr. 5, 1921 |
| 1,497,801 | Smith | June 17, 1924 |